(12) United States Patent
Armstrong et al.

(10) Patent No.: US 7,178,422 B2
(45) Date of Patent: Feb. 20, 2007

(54) ELECTRICAL TILT AND TELESCOPE LOCKING MECHANISM

(75) Inventors: Ray G. Armstrong, Bay City, MI (US); Philip J. McCarthy, Saginaw, MI (US); Ravindra Jwalapathy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 233 days.

(21) Appl. No.: 10/884,238

(22) Filed: Jul. 2, 2004

(65) Prior Publication Data

US 2006/0005658 A1 Jan. 12, 2006

(51) Int. Cl.
*B62D 1/18* (2006.01)

(52) U.S. Cl. ........................................ 74/493; 280/775
(58) Field of Classification Search .................. 74/493, 74/495, 500.5, 492; 280/775
See application file for complete search history.

(56) References Cited

U.S. PATENT DOCUMENTS

| | | | |
|---|---|---|---|
| 4,752,085 A | 6/1988 | Yamamoto | 280/775 |
| 5,131,287 A * | 7/1992 | Stromberg | 74/493 |
| 5,240,284 A * | 8/1993 | Takada et al. | 280/775 |
| 5,485,376 A | 1/1996 | Oike et al. | 364/424.05 |
| 5,520,416 A | 5/1996 | Singer et al. | 280/775 |
| 5,562,306 A | 10/1996 | Rispeter et al. | 280/775 |
| 5,820,163 A * | 10/1998 | Thacker et al. | 280/775 |
| 5,829,311 A | 11/1998 | Roberson | 74/493 |
| 6,167,777 B1 * | 1/2001 | Snell | 74/493 |
| 6,189,405 B1 | 2/2001 | Yazane | 74/493 |
| 6,237,438 B1 * | 5/2001 | Ben Rhouma et al. | 74/492 |
| 6,354,626 B1 * | 3/2002 | Cartwright | 280/777 |
| 6,390,505 B1 | 5/2002 | Wilson | 280/775 |
| 6,419,269 B1 | 7/2002 | Manwaring et al. | 280/775 |
| 6,616,185 B2 | 9/2003 | Manwaring et al. | 280/775 |
| 2004/0251671 A1 * | 12/2004 | Zillmann | 280/775 |
| 2005/0172751 A1 * | 8/2005 | Hong et al. | 74/493 |

* cited by examiner

*Primary Examiner*—Richard Ridley
*Assistant Examiner*—James Pilkington
(74) *Attorney, Agent, or Firm*—Michael D. Smith

(57) ABSTRACT

A locking device for selectively preventing telescoping movement between first and second members and tilting movement associated with the first and second members. The locking device includes an electric motor for generating a moving force. The locking device also includes a first locking portion associated with the electric motor to move between first locked and unlocked positions in response to the moving force. The first locking portion selectively prevents telescoping movement between the first and second members. The locking device also includes a second locking portion spaced from the first locking portion. The second locking portion is also associated with the electric motor to move between second locked and unlocked positions in response to the moving force. The second locking portion selectively prevents tilting movement associated with the first and second members. The first and second members can tilt about a first end of the first member or the tilting movement can be defined between the second member and a third member pivotally associated with the second member.

28 Claims, 16 Drawing Sheets

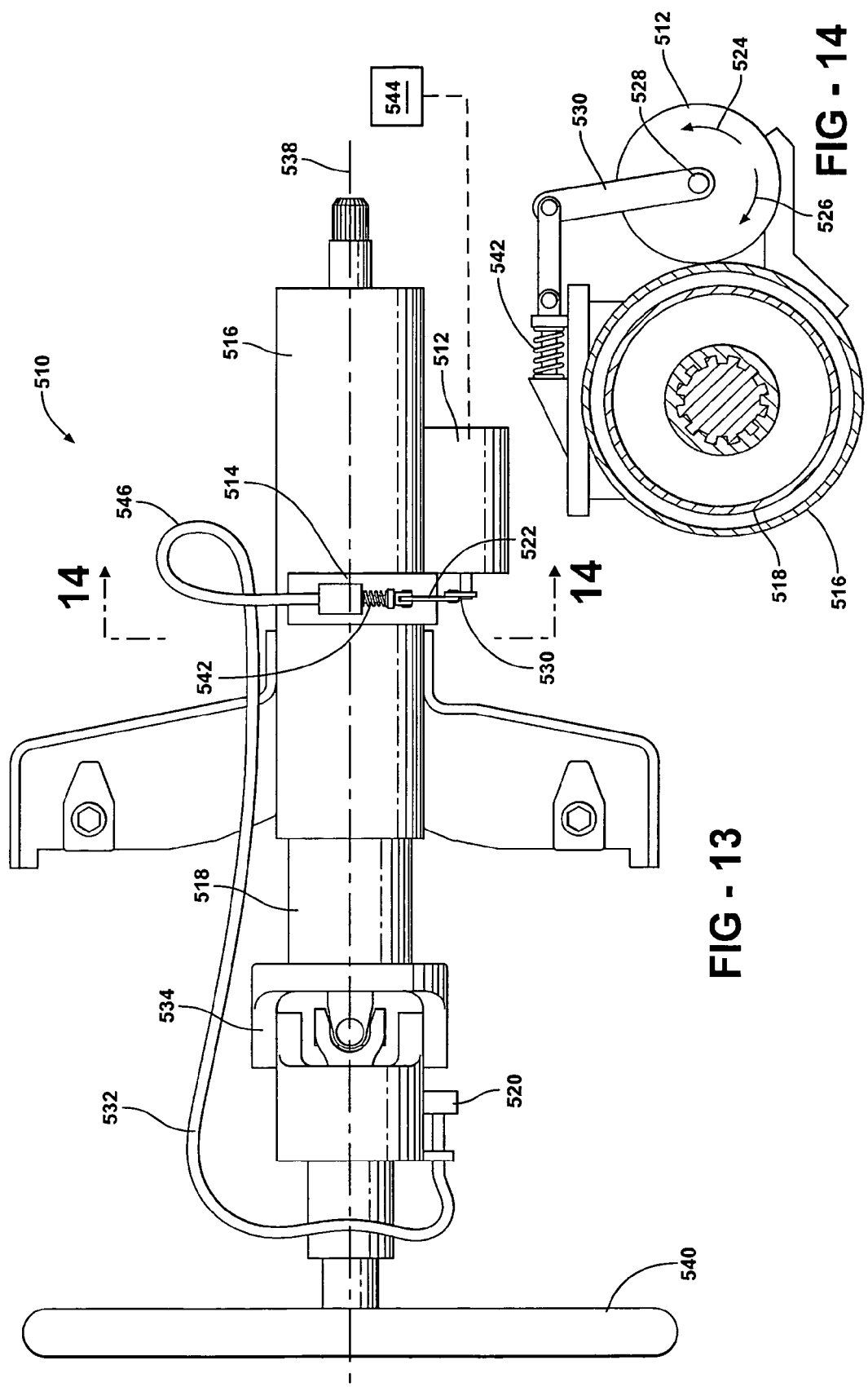

ELECTRICAL TILT AND TELESCOPE LOCKING MECHANISM

TECHNICAL FIELD

This invention relates to a locking device for selectively preventing tilting and telescoping movement and more particularly the invention provides a locking device for locking an adjustable steering column to position a steering wheel in a vehicle.

BACKGROUND OF THE INVENTION

Current steering columns include two levers that individually engage separate locking mechanisms for preventing tilting and telescoping motion. In other words, a first lever controls a first mechanism for locking the steering column with respect to telescopic adjustment and a second lever controls a second mechanism for locking the steering column with respect to tilting adjustment. The two levers are usually disposed underneath the steering column. As a result, the levers can be difficult to locate, cumbersome and inconvenient for the driver to operate, and create knee impact problems during a crash event.

SUMMARY OF THE INVENTION

The present invention provides a locking device for selectively preventing telescoping movement between first and second members and tilting movement associated with the first and second members. The locking device includes an electric motor for generating a moving force. The locking device also includes a first locking portion associated with the electric motor to move between first locked and unlocked positions in response to the moving force. The first locking portion selectively prevents telescoping movement between the first and second members. The locking device also includes a second locking portion spaced from the first locking portion. The second locking portion is also associated with the electric motor to move between second locked and unlocked positions in response to the moving force. The second locking portion selectively prevents tilting movement associated with the first and second members. The first and second members can tilt about a first end of the first member or the tilting movement can be defined between the second member and a third member pivotally associated with the second member.

In the exemplary embodiment of the invention, a locking device is provided the selectively prevents telescoping and tilting movement associated with a vehicle steering column. The locking device includes an electric motor that generates a moving force for moving first and second locking portions. A button can control engagement of the electric motor to eliminate levers used for moving locking portions. The button can be disposed anywhere in the vehicle, such as on the steering wheel or on the dashboard.

BRIEF DESCRIPTION OF THE DRAWINGS

These and other features and advantages of the present invention will become more readily appreciated when considered in connection with the following detailed description and appended drawings, where:

FIG. 13 is a bottom view of a first exemplary embodiment of the invention associated with the vehicle steering column;

FIG. 14 is a rear view of the first exemplary embodiment shown in FIG. 13;

DETAILED DESCRIPTION OF THE PREFERRED EMBODIMENTS

Figure 1:
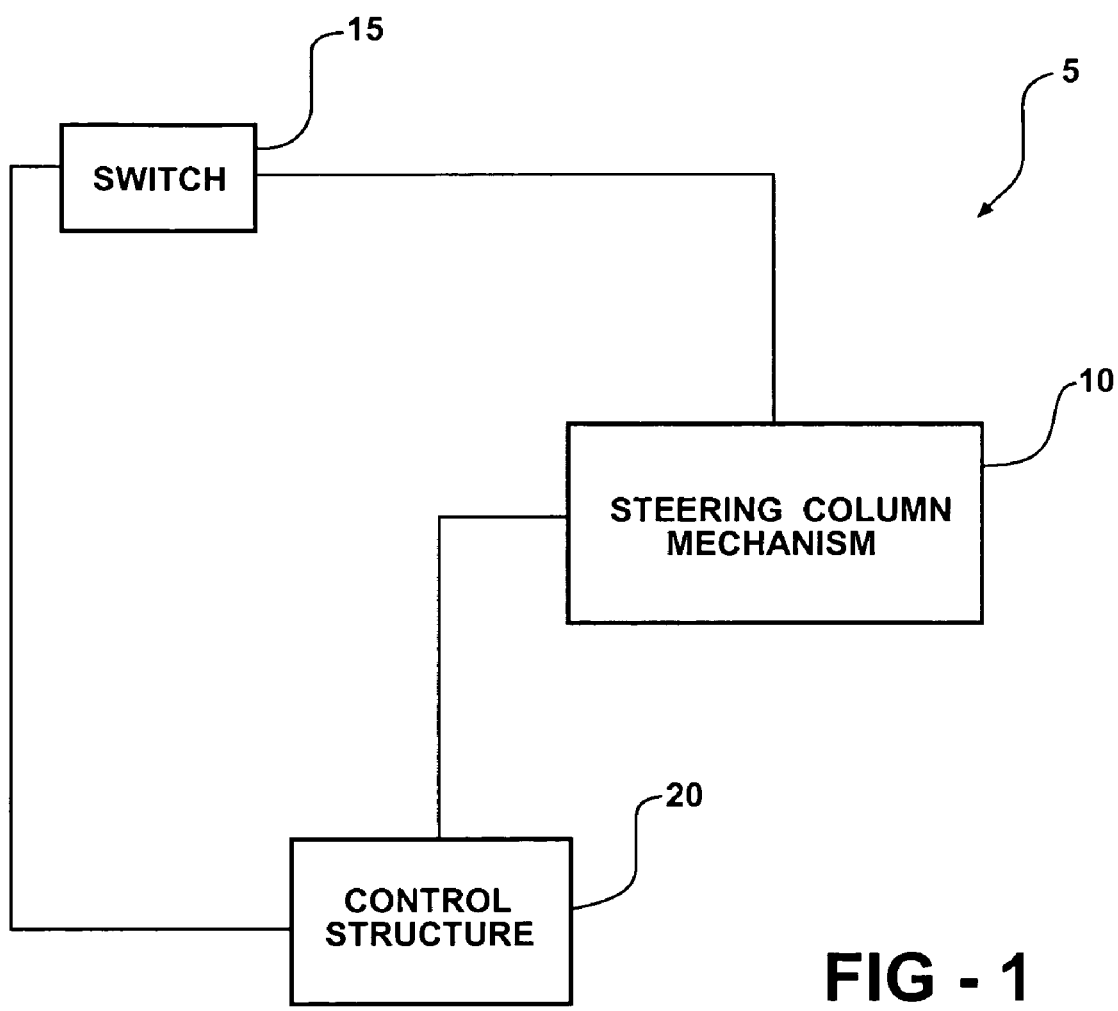
FIG. 1 is a schematic diagram of an electrically actuated steering column system.

FIG. 1 schematically shows an electrically actuated steering column system 5 according to a first exemplary of a electrically actuated steering column system. The electrically actuated steering column system 5 includes a steering column 10, a switch 15, and a control structure 20. The steering column 10 is adjustable to position a steering wheel in a vehicle and the control structure 20 prevents adjusting movement of the steering column 10 after the steering wheel has been positioned in a desired position. The switch 15 is spaced from the steering column 10 and selectively activates or deactivates the control structure 20 to allow or prevent, respectively, movement of the steering column 10. The switch 15 can be disposed at any one of a plurality of different locations in the vehicle.

Figure 2:
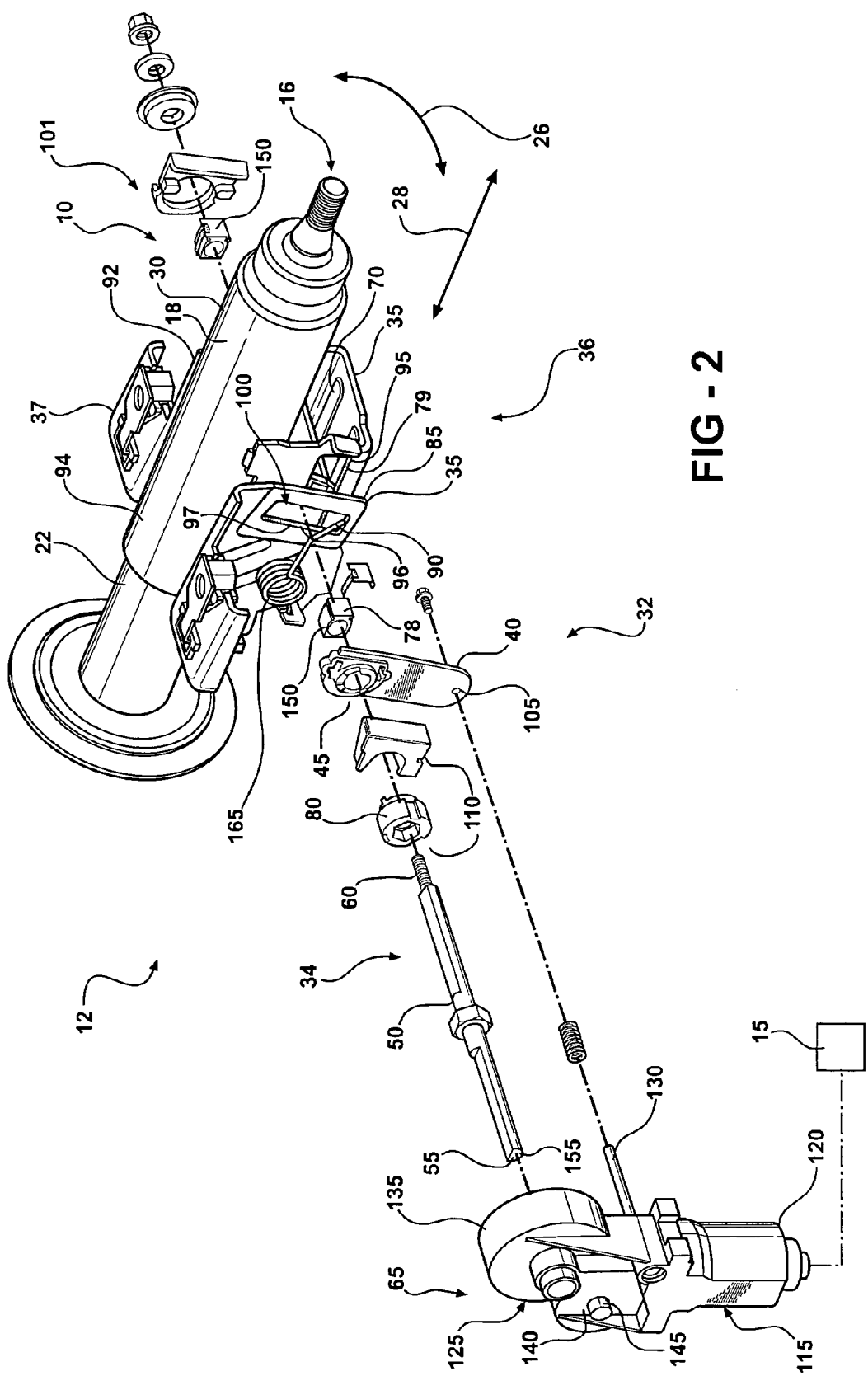
FIG. 2 is an exploded view of the steering column shown in FIG. 1.
Figure 3:
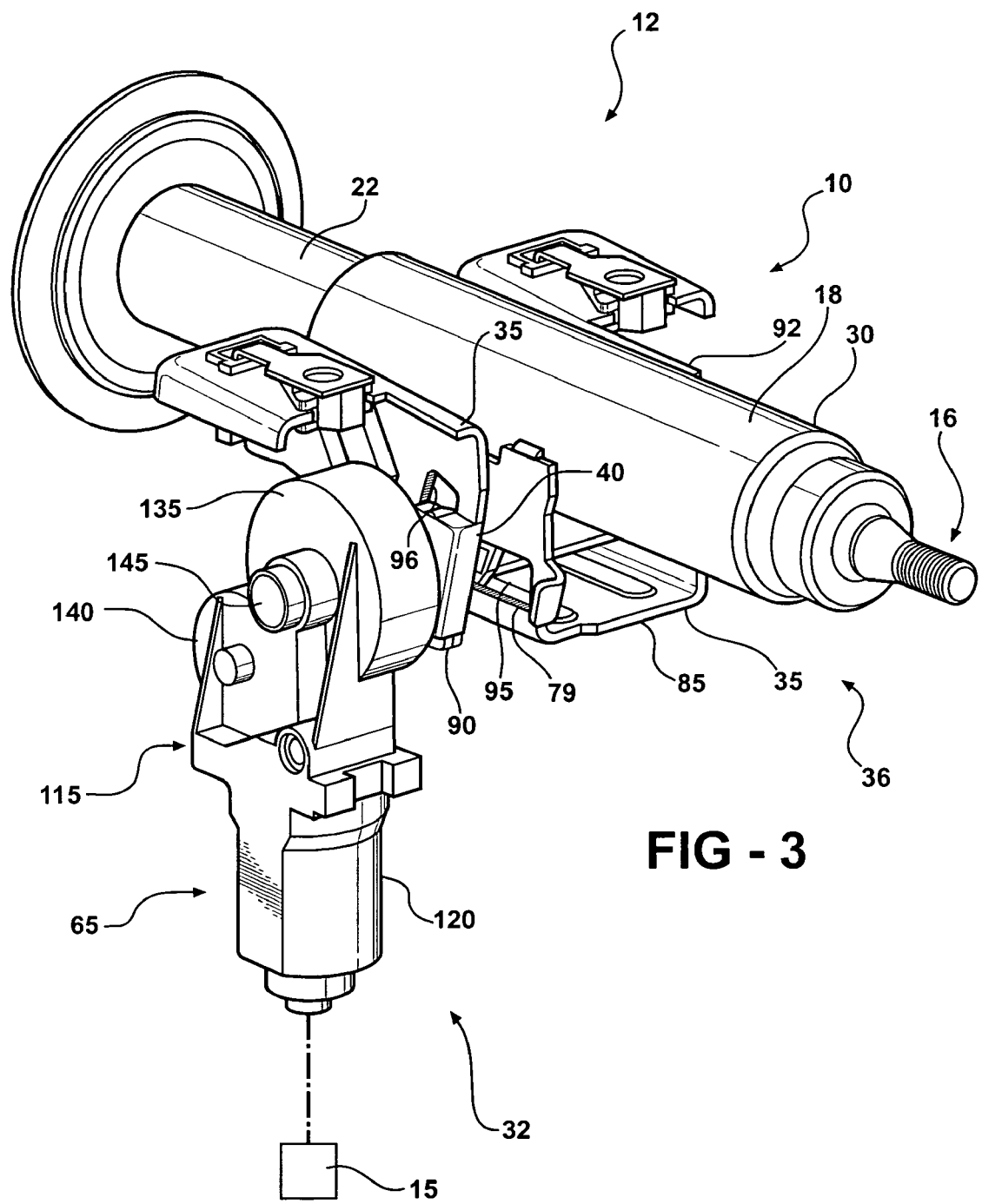
FIG. 3 is a perspective view of the steering column shown in FIG. 1.

FIGS. 2 and 3 provide detailed views of the first exemplary electrically actuated steering column system. The steering column 10 includes a steering wheel supporting portion 16 for supporting a steering wheel in a vehicle. The steering column 10 also includes a first and second members 18, 22 that are moveable relative to one another. The first and second members 18, 22 are moveable relative to one another over a tilting path 26 of movement, or a telescoping path 28 of movement, or both. As used herein, tilting movement contemplates both full column tilting movement and raking movement associated with a tilt housing. The driver moves the first and second members 18, 22 relative to one another to adjustably position the steering wheel supporting portion 16 and, as a result, the steering wheel. The first member 18 is shown as upper and outer steering column jacket and the second member 22 is shown as a lower or inner steering column jacket. In alternative embodiments of the electrically actuated steering column system, the first member 18 could be inner steering column jacket. Also, the steering column 10 could include a tilt housing engaged with a pair telescoping members. Also, the first and second members 18, 22 could be defined as brackets.

The first member 18 of the steering column 10 defines a housing 30. At least one movement bracket 35 is attached to the housing 30. The bracket 35 is movably associated with a second bracket 37 attached to the vehicle. For example, the bracket 35 can move transversely relative to the second bracket 37 to support the steering column 10 during movement along the tilting path 26. Also, the bracket 35 can move longitudinally relative to the second bracket 37 to support the steering column 10 during movement along the telescoping path 26. The brackets 35, 37 define slots 95, 97 on opposite sides 100, 101, respectively, of the housing 30 and a first shaft 34, such as a rake bolt 50, extends through the slots 95, 97 on both sides 100, 101 to limit the range of movement between the brackets 35, 37 over both the tilting path 26 and the telescoping path 28.

The control structure 20 referred to above includes appropriate structure for preventing movement between the first and second members 18, 22. The control structure 20 includes a locking device 32 selectively engageable with the first and second members 18, 22 to lock the first and second members 18, 22 with respect to one another and substantially prevent movement along the tilting path 26 and the telescoping path 28. The steering column 10 and the locking device 32 define an apparatus 12. The locking device 32 includes an electric motor 120 and locking portion driven between locked and unlocked positions by movement of the electric motor 120. For example, the locking device 32 of the first exemplary embodiment includes a squeeze-lock 36. The first and second members 18, 22 are locked and unlocked with respect to one another in response to activation of the electric motor 120. For example, when the electric motor 120 is activated in a first mode of operation, the squeeze-lock 36 compresses the brackets 35, 37 with respect to one another and locks the first and second members 18, 22 relative to one another. When the electric motor 120 is activated in a second mode of operation, the squeeze-lock 36 reduces the compressive forces acting on the brackets 35, 37 and unlocks the first and second members 18, 22 relative to one another. The first mode of operation of the electric motor 120 corresponds to a shaft (not shown) of the electric motor 120 rotating in a first direction and the second mode of operation corresponds to the shaft rotating in a second direction, wherein the first and second directions are opposite with respect to one another. As set forth below, the electric motor 120 cooperates with the rake bolt 50 to move the squeeze-lock 36 between the locked and unlocked positions. In the first exemplary embodiment, the electric motor 120 is directly engaged with the first shaft 34a.

The squeeze-lock 36 includes a support plate 40 engaged with a cam 45. The cam 45 of the support plate 40 may be formed integrally with the support plate 40 or be a piece that is connected with the support plate 40. For example, a bore 105 may be formed within the support plate 40 in which the cam 45 is press fit. The manner of forming the cam 45 in the support plate 40 is not critical and alternative means of forming cams within the support plate 40 can be utilized without departing from the inventive aspect of the mechanism.

The support plate 40 also preferably includes a cam guide 110 attached therewith. The cam guide 110 aligns a cam insert 80 with the cam 45 formed in the support plate 40. The cam insert 80 disposed about the rake bolt 50 to facilitate increasing or decreasing a compression force to allow for movement of the housing 30 relative to a driver. As can be seen in FIG. 2, the cam guide 110 has a shape corresponding to the cam insert 80 to prevent misalignment of the cam insert 80 with the cam 45.

The rake bolt 50 has first 55 and second 60 ends. An electric actuator 65 is attached to the rake bolt 50 at the first end 55 and allows for moving the rake bolt 50. Movement of the rake bolt 50 allows a switching action whereby movement of the housing 30 relative to a driver is initiated and halted. The electric actuator 65 is described in greater detail below.

The at least one movement bracket 35 of the first embodiment preferably comprises a mounting bracket 85 and a rake bracket 90 both of which are attached to the housing 30. The mounting bracket 85 is generally a U-shaped member attached at an underside of the housing 30. The mounting bracket 85 has slots 95 formed on opposite sides 100. The slots 95 allow the rake bolt 50 to pass through. The first embodiment also includes a second rake bracket 92 attached to the housing 30 on an opposite side 94 of the housing 30 relative to a first rake bracket 90 thereby creating a symmetrical orientation. In this manner, the housing 30 can maintain a uniform collapse stroke during a crash.

The electric actuator 65 includes an electric motor assembly 115. The electric motor assembly 115 includes the electric motor 120, gearing 125 for transferring the rotary motion of the electric motor 120, and a mounting rod 130 for attaching the electric motor assembly 115 to the support plate 40. The gearing 125 associated with the electric motor assembly 115 comprises a partial gear 135 that is meshed with a gear 140 that is connected to the electric motor 120. The first end 55 of the rake bolt 50 is connected to the partial gear 135 for providing movement to the rake bolt 50. A limiting switch 145 is associated with the partial gear 135 to stop rotation of the partial gear 135 corresponding to initiating and halting movement of the steering column housing 30 relative to a driver.

The electric actuator 65 need not be directly attached to the rake bolt 50, as described above. The actuator 65 can be placed at other positions on the steering column housing 30 and the rotary motion transmitted to the rake bolt 50 and the cam insert 80 through a belt and pulley drive, a chain and sprocket drive or a screw rod and crank without departing from the inventive aspect of the mechanism. Also, the cam 45 and cam insert 80 may be replaced by a multiple lead screw rod that may be turned by the electric actuator 65 to clamp the mounting bracket 85 and increase or decrease the compression force as described above.

In a preferred aspect of the electrically actuated steering column system, the rake bolt 50 includes a locking portion 150 circumferentially disposed thereon for interacting with the mounting 85 and rake brackets 90, 92. In a preferred embodiment, two locking portions 150 are disposed about the rake bolt 50 to interact with the symmetrically positioned mounting bracket 85 and rake brackets 90 and 92, as previously described. As stated above, the mounting bracket 85 includes slots 95 formed on opposite sides 100 of the mounting bracket, to allow for passage of the rake bolt 50. The slots 95, in a preferred aspect, include serrations 79 formed along a bottom edge of the slot such that they engage with teeth 78 formed on the locking portion 150. The rake brackets 90, 92 also include serrations 96 formed on an edge of the slot, again to mesh with the teeth 78 formed on the locking portion 150 during a collision. The teeth 78 formed on the locking portion 150 and the serrations 79, 96 formed on the mounting 85 and rake brackets 90, 92 provide a positive locking feature designed to move the steering column housing 30 in a uniform manner along a collapse stroke, during a collision. The first end 55 of the rake bolt 50 may include a shaped portion 155 that mates with the electric motor assembly 115. The shaped portion 155 can be square, keyed, any other shape that is designed to mesh with the partial gear 135 of the electric motor assembly 115.

The first embodiment includes a spring 165 associated with the support plate 40 that allows for movement of the electric motor assembly 115 corresponding to movement of the housing 30. In this manner, the electric motor assembly 115 is allowed to move relative to the housing 30 while maintaining a connection with the rake bolt 50. The spring 165 is attached at a first end with the support plate 40 and at a second end to the electric motor assembly 115.

In another aspect of the first embodiment of the electrically actuated steering column system, a positioning spring may be disposed between the mounting bracket 85 and the housing 30 for applying a constant biasing force that returns the housing 30 to an initial position when a force is not applied by the driver to move the housing 30. In this manner, when the steering column 10 is initiated to allow movement of the housing 30, the default position of fully telescoped in the most upward rake position will allow a driver to exit a vehicle without having to apply a force to the housing 30.

As described above with reference to the electrically actuated steering column system 5, a door switch, as opposed to the switch 15, may be included in a driver door such that when a vehicle is shutoff and the driver opens a door to exit, the steering column 10 is initiated to allow movement of the steering column housing 30. The positioning spring then applies a force to the rake bracket returning the housing 30 to an initial position, as detailed above.

In use, as the switch 15 of the electrically actuated steering column system is depressed by a driver, the steering column 10 is allowed to move relative to the driver. The control structure 20 regulates the steering column 10 to permit and prevent movement of the housing 30.

Figure 5:
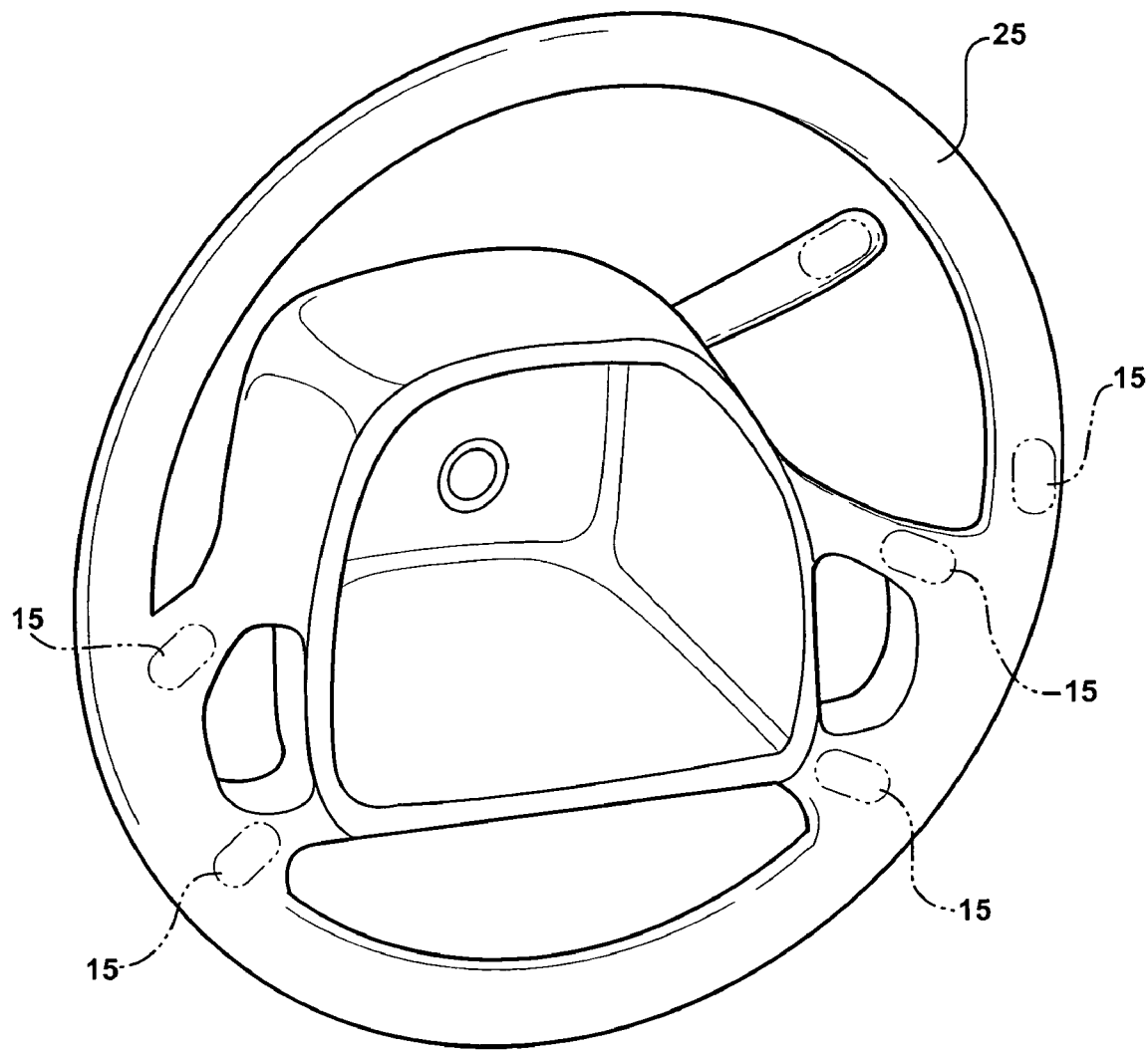
FIG. 5 is a perspective view of a steering wheel showing a plurality of possible positions for locating a switch.

Specifically, when the switch 15 is depressed by a diver, the electric motor 120 of the electric motor assembly 115 turns a gear 140 that is meshed with a partial gear 135. As best shown in FIG. 5, the switch 15 can be disposed on the steering wheel. The first end 55 of the rake bolt 50 is connected with the partial gear 135 such that the rake bolt 50 is turned in a rotary manner. The cam insert 80 disposed about the rake bolt 50 engages the cam 45 of the support plate 40 such that the compression force placed on the steering column 10 is decreased to allow movement of the steering column housing 30 relative to the driver. In other words, depressing the switch 15 activates the electric motor 120 in the second mode of operation to move the components that cooperate to frictionally lock the steering column 10 against adjustment to the unlocked position by releasing the frictional bonding force applied to the steering column 10. The control structure 20 deactivates the electric motor 120 once rotation of the rake bolt 50 has sufficiently reduced the compression force to allow movement of the steering column housing 30. When the switch 15 is released by the driver, the control structure 20 initiates the electric motor 120 in the first mode of operation to turn the rake bolt 50 in an opposite direction to again apply a compression force to the electrically actuated steering column mechanism 10 such that movement of the steering column housing 30 relative to a driver is prevented. In other words, releasing the switch 15 moves the frictional locking device back to the locked position to prevent adjustment of the column mechanism 10. In this manner, a driver can simply depress a switch 15 to unlock the column for adjustment and release the switch 15 to restore the column 10 to a locked condition, thereby allowing slideable movement of the steering column housing 30 without the use of a lever as is commonly utilized in the art.

Figure 4:
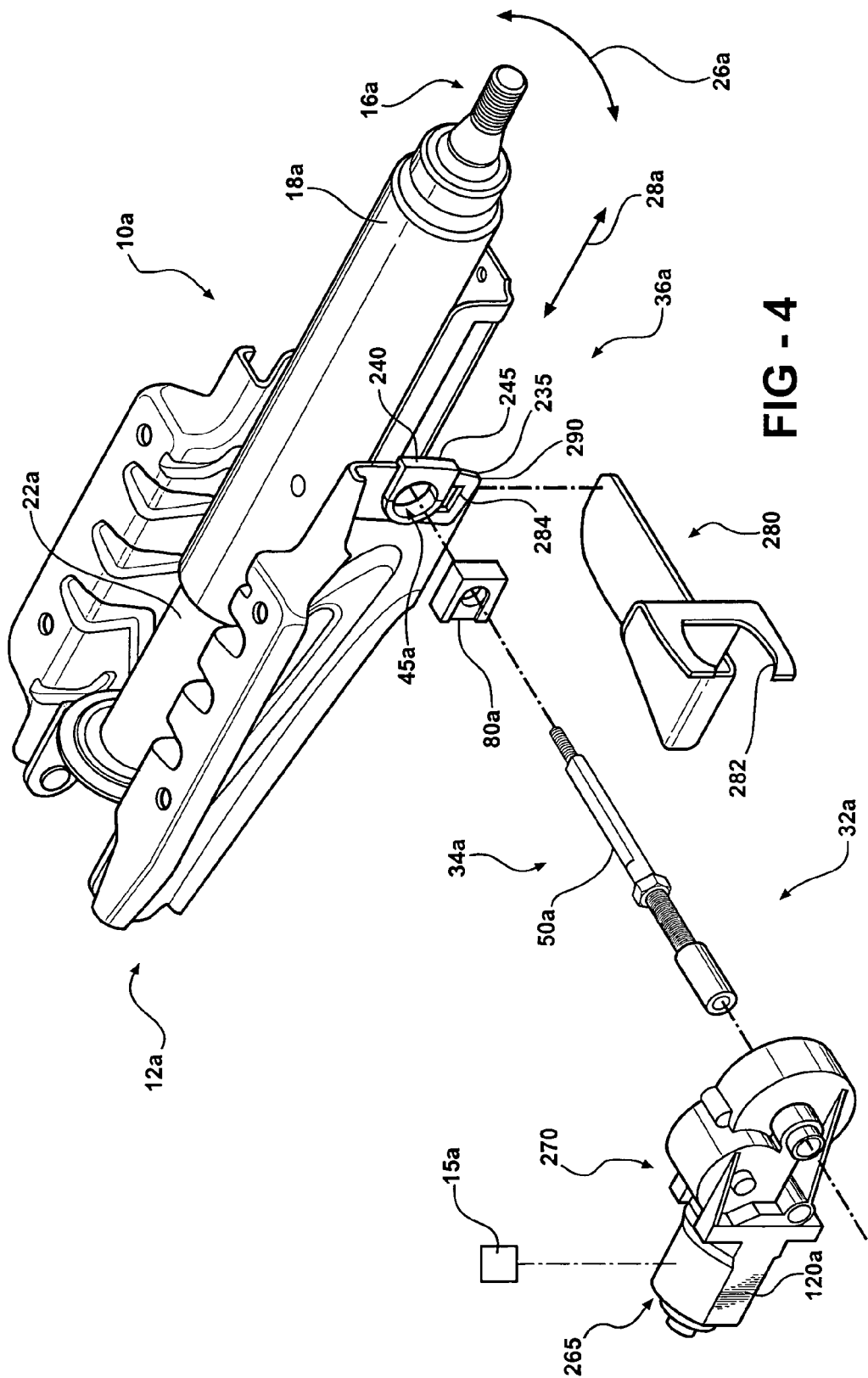
FIG. 4 is an exploded view of a second exemplary electrically actuated steering column system.

FIG. 4 shows a second embodiment of the steering column 10*a*. The steering column 10*a* includes first and second members 18*a* and 22*a*, as well as a steering wheel supporting portion 16*a*. The steering column 10*a* is adjustable only in a tilting manner along a tilting path 26*a* of movement and does not move along a telescoping path 28*a* of movement. The second embodiment also includes a locking device 32*a* cooperates with the steering column 10*a* to define an apparatus 12*a*. Therefore, the at least one movement bracket 235 comprises a rake bracket 290 only. The support plate 240 of the second embodiment is attached to the rake bracket 290 and includes a cam 45*a* just as with the previously described first embodiment. Again, a cam insert 80*a* is disposed over a first shaft 34*a*, such as a rake bolt 50*a*, to interact with the cam 45*a* to increase and decrease a compressive force, as previously described with reference to the first embodiment. With reference to FIG. 4, it can be seen that the support plate 240 of the second embodiment includes a flange 245 that engages the rake bracket 290 such that the support plate 240 can move relative to the rake bracket 290. The second embodiment also includes an electric actuator 265 that comprises an electric motor assembly 270 that includes an electric motor 120*a* activated for movement by a switch 15*a*. The electric motor 120*a* extends parallel to the steering column 10*a*. The electric motor assembly 270 is similar in respect to that of the previously described first embodiment with the exception that the electric motor assembly 270 does not include a mounting rod, as the support plate 240 is attached to the rake bracket 290. The electric motor assembly 270 of the second embodiment otherwise operates in a similar fashion to that of the first embodiment previously described. The electric motor assembly of the second embodiment, is however attached to the rake bracket 290 utilizing a motor mounting bracket 280. The motor mounting bracket 280 includes a C-shaped slot 282 that allows for the motor assembly to move while the motor mounting bracket 280 is permanently secured to a portion of the vehicle structure. In this manner, the motor assembly 270 is free-floating within the C-shaped slot to allow for movement of the rake bolt 50*a* within the slot 284 formed in the rake bracket 285.

Figure 6:
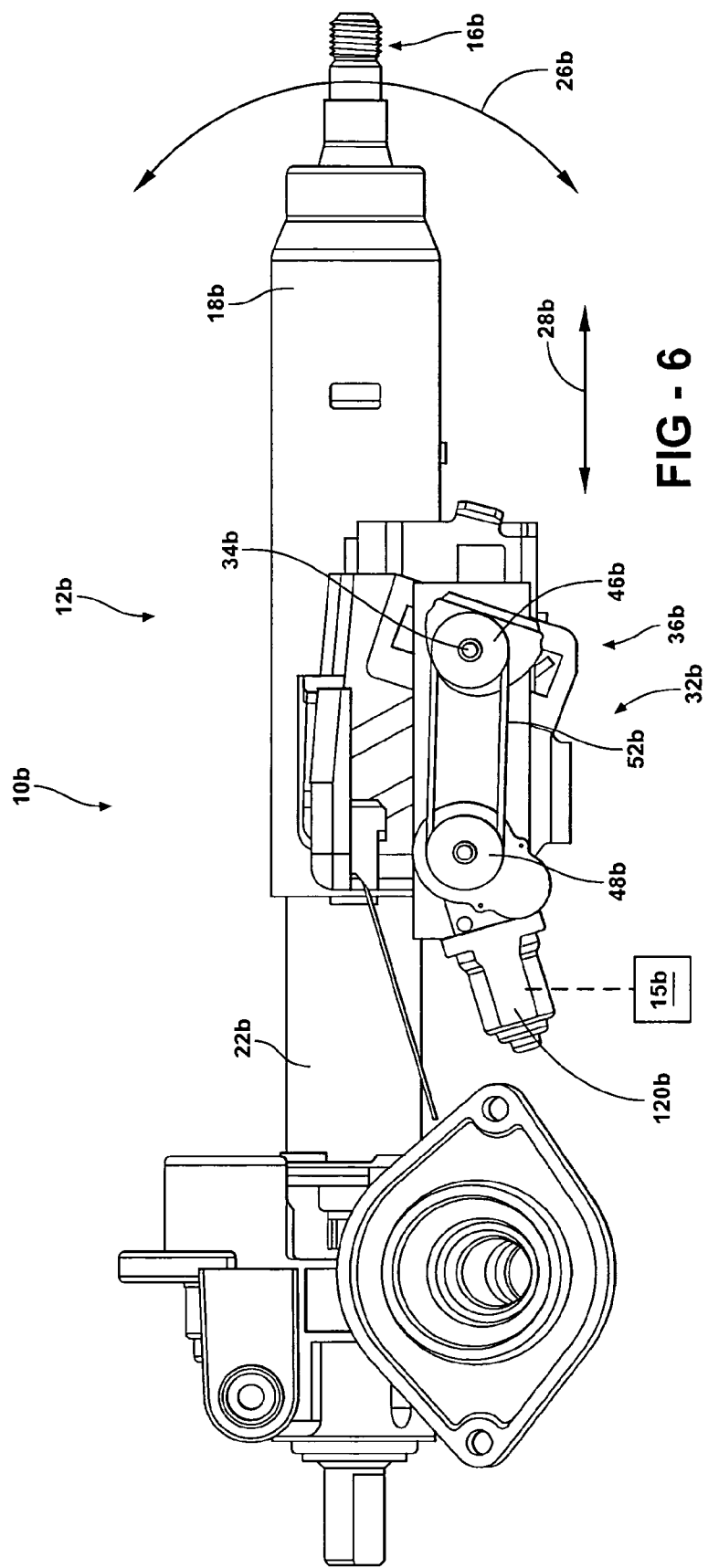
FIG. 6 is a side view of a third exemplary electrically actuated steering column system.

Referring now to FIG. 6, in a third exemplary embodiment of the electrically actuated steering column system, an apparatus 12*b* includes a steering column 10*b* and a locking device 32*b*. The steering column 10*b* includes a steering wheel supporting portion 16*b* for supporting a steering wheel. The steering column 10*b* also includes first and second members 18*b*, 22*b* that are moveable relative to one another to move the steering wheel supporting portion 16*b*. The first and second members 18*b*, 22*b* can support the steering wheel supporting portion 16*b* for movement along a tilting path 26*b* of movement, or a telescoping path 28*b* of movement, or both. The locking device 32*b* is selectively engageable with the first and second members 18*b*, 22*b* to lock the first and second members 18*b*, 22*b* with respect to one another and substantially prevent movement of the steering wheel supporting portion 16*b*. The locking device 32*b* includes an electric motor 120*b* and the first and second members 18b, 22b are locked or unlocked with respect to one another in response to activation of the electric motor 120b. The locking device 32b also includes a squeeze-lock 36b associated with a first shaft 34b and moved between locked and unlocked positions by the motor 120b. A switch 15b selectively activates the motor 120b.

The motor 120b moves at least a portion of the locking device 32b between first and second positions to lock and unlock, respectively, the first and second members 18b, 22b relative to one another. In the exemplary embodiment of the electrically actuated steering column system, the portion of the locking device 32b moved by the motor 120b is the first shaft 34b. However, in alternative embodiments of the electrically actuated steering column system, the portion could be a member defining teeth or a pin selectively insertable in an aperture or any other locking member. In the exemplary embodiment of the electrically actuated steering column system, the motor 120b moves the portion in rotation between first and second angular positions. However, in alternative embodiments of the electrically actuated steering column system, the movement of the portion could be translation or a combination of translation and rotation.

The electric motor 120b extends transverse to the steering column 10b and an intermediary member is operably disposed between the electric motor 120b and the first shaft 34b. The intermediary member includes a first pulley 46b engaged with the first shaft 34b and a second pulley 48b engaged with the electric motor 120b. A flexible drive member 52b is engaged with the first and second pulleys 46b, 48b. Rotation of the pulley 48b is communicated to the pulley 46b by the flexible drive member 52b. In alternative embodiments of the electrically actuated steering column system, the pulleys 46b, 48b can be replaced with sprockets and the flexible drive member 52b can be a chain.

Figure 7:
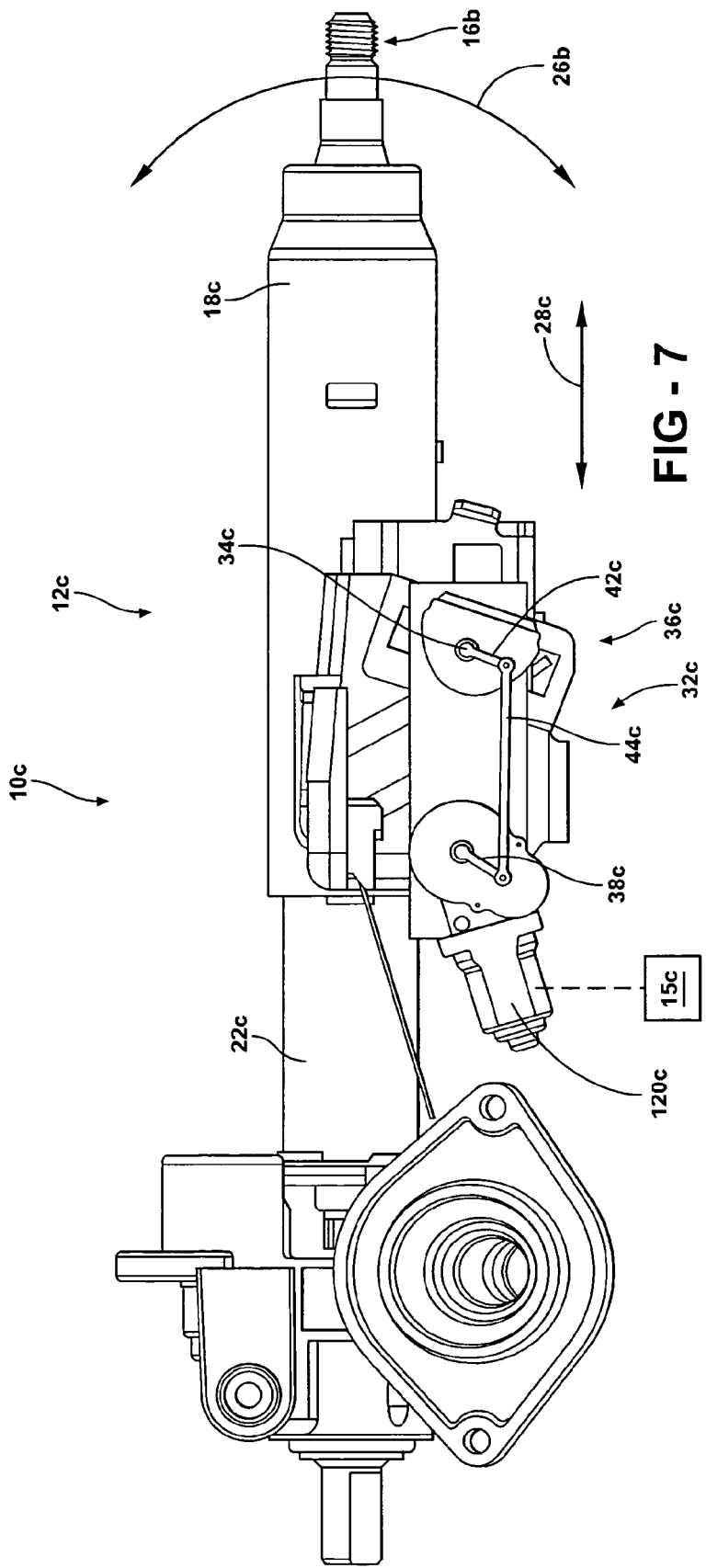
FIG. 7 is a side view of a fourth exemplary electrically actuated steering column system.

Referring now to FIG. 7, in a fourth exemplary embodiment of the electrically actuated steering column system, an apparatus 12c includes a steering column 10c and a locking device 32c. The steering column 10c includes a steering wheel supporting portion 16c for supporting a steering wheel. The steering column 10c also includes first and second members 18c, 22c that are moveable relative to one another to move the steering wheel supporting portion 16c. The first and second members 18c, 22c can support the steering wheel supporting portion 16c for movement along a tilting path 26c of movement, or a telescoping path 28c of movement, or both. The locking device 32c is selectively engageable with the first and second members 18c, 22c to lock the first and second members 18c, 22c with respect to one another and substantially prevent movement of the steering wheel supporting portion 16c. The locking device 32c includes an electric motor 120c and the first and second members 18c, 22c are locked or unlocked with respect to one another in response to activation of the electric motor 120c. The locking device 32c also includes a squeeze-lock 36c associated with a first shaft 34c and moved between locked and unlocked positions by the motor 120c. A switch 15c selectively activates the motor 120c.

The locking device 32c also includes an intermediary member such as a second shaft 38c. Activation of the electric motor 120c rotates the second shaft 38c and the first shaft 34c rotates in response to rotation of the second shaft 38c. The first and second shafts 34c, 38c are transverse with respect to one another. The second shaft 38c defines a longitudinal axis and is rotated about a rotational axis that extends transverse to the longitudinal axis. The intermediary member associated with the apparatus 12c also includes first and second linking members 42c, 44c operably disposed between the first and second shafts 34c, 38c. The linking member 44c rotates and translates in response to rotation of the second shaft 38c. The linking member 42c rotates in response to translation and rotation of the linking member 44c. The first shaft 34c rotates in response to rotation of the linking member 42c.

Figure 8:
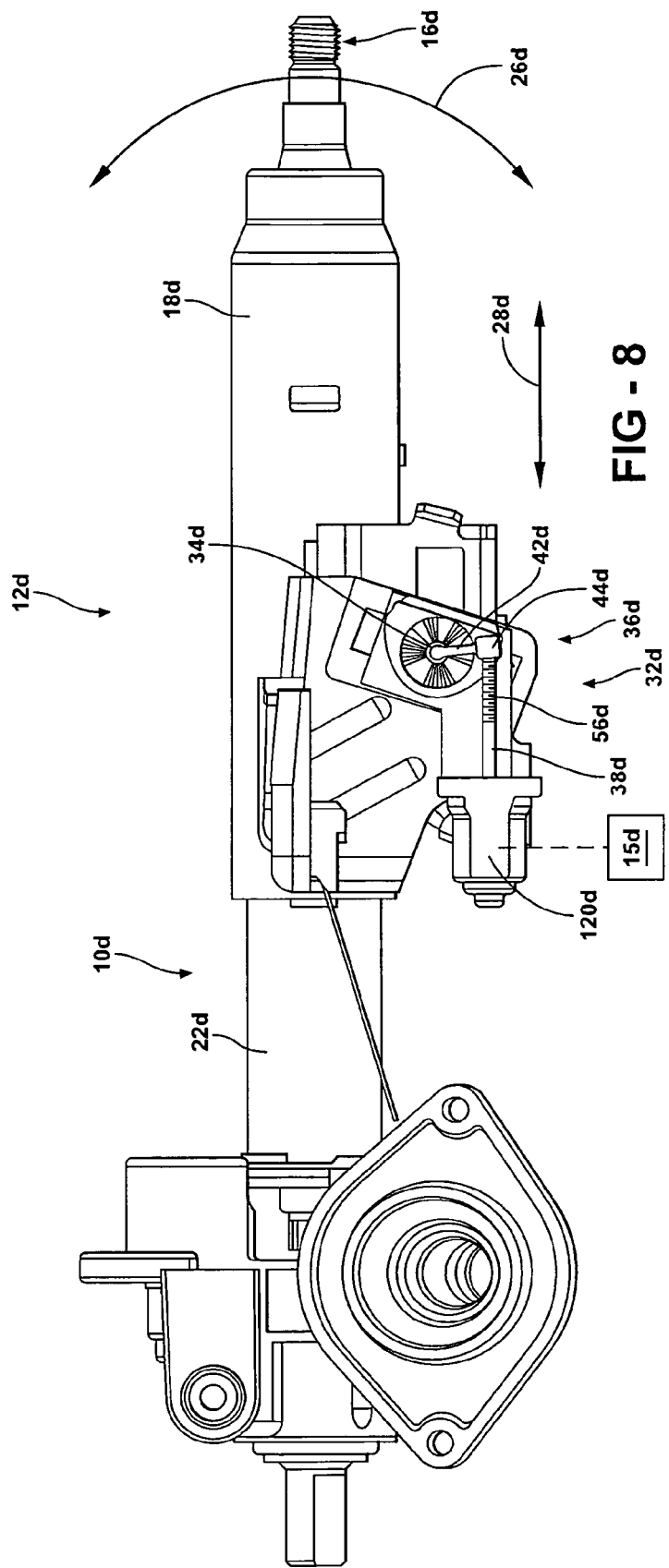
FIG. 8 is a side view of a fifth exemplary electrically actuated steering column system.

Referring now to FIG. 8, in a fifth exemplary embodiment of the electrically actuated steering column system, an apparatus 12d includes a steering column 10d and a locking device 32d. The steering column 10d includes a steering wheel supporting portion 16d for supporting a steering wheel. The steering column 10d also includes first and second members 18d, 22d that are moveable relative to one another to move the steering wheel supporting portion 16d. The first and second members 18d, 22d can support the steering wheel supporting portion 16d for movement along a tilting path 26d of movement, or a telescoping path 28d of movement, or both. The locking device 32d is selectively engageable with the first and second members 18d, 22d to lock the first and second members 18d, 22d with respect to one another and substantially prevent movement of the steering wheel supporting portion 16d. The locking device 32d includes an electric motor 120d and the first and second members 18d, 22d are locked or unlocked with respect to one another in response to activation of the electric motor 120d. The locking device 32d also includes a squeeze-lock 36d associated with a first shaft 34d and moved between locked and unlocked positions by the motor 120d. A switch 15d selectively activates the motor 120d.

The locking device 32d also includes an intermediary member such as a second shaft 38d that defines a worm gear 56d. The locking device 32d also includes linking members 42d and 44d. The linking member 44d is a nut associated with the worm gear 56d. For example, the linking member 44d translates in response to rotation of the second shaft 38d, the shaft 38d rotating about its longitudinal axis. The linking member 42d rotates in response to translation of the linking member 44d. The shaft 34d rotates in response to rotation of the linking member 42d.

Figure 9:
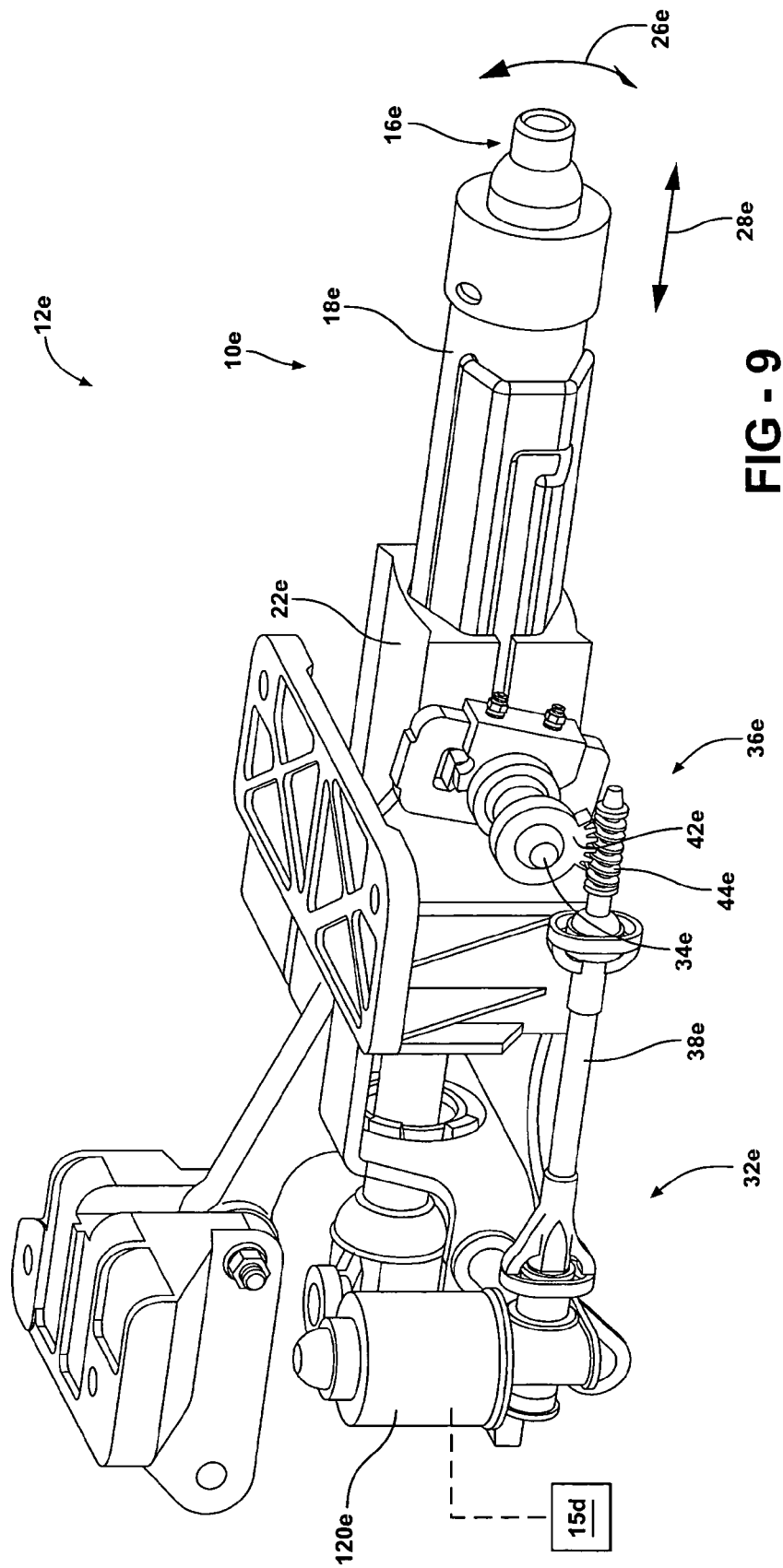
FIG. 9 is a side view of a sixth exemplary electrically actuated steering column system.
Figure 10:
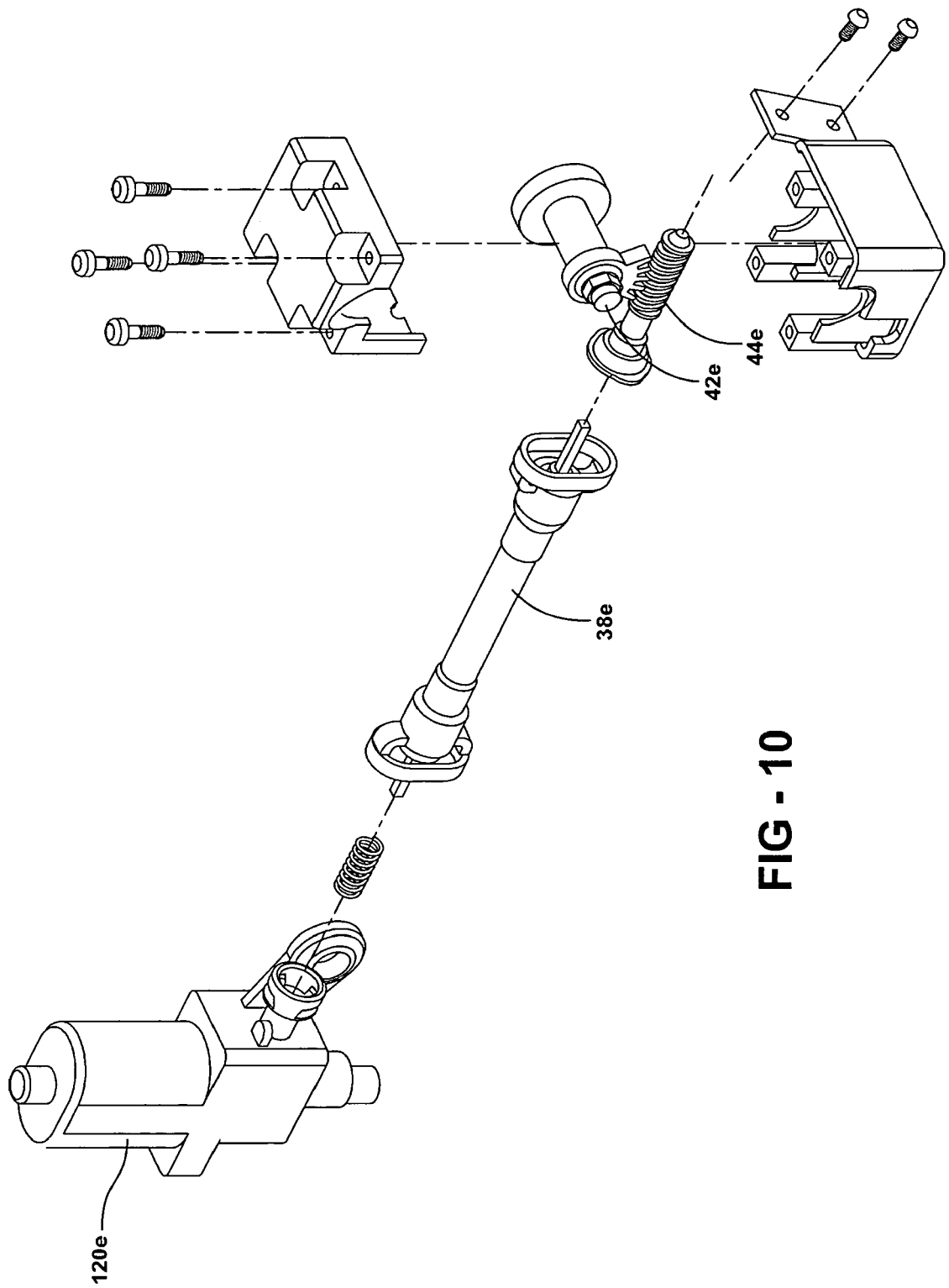
FIG. 10 is an exploded view of a portion of a locking device associated with the fifth exemplary electrically actuated steering column system.

Referring now to FIG. 9, in a sixth exemplary embodiment of the electrically actuated steering column system, an apparatus 12e includes a steering column 10e and a locking device 32e. The steering column 10e includes a steering wheel supporting portion 16e for supporting a steering wheel. The steering column 10e also includes first and second members 18e, 22e that are moveable relative to one another to move the steering wheel supporting portion 16e. The first and second members 18e, 22e can support the steering wheel supporting portion 16e for movement along a tilting path 26e of movement, or a telescoping path 28e of movement, or both. The locking device 32e is selectively engageable with the first and second members 18e, 22e to lock the first and second members 18e, 22e with respect to one another and substantially prevent movement of the steering wheel supporting portion 16e. The locking device 32e includes an electric motor 120e and the first and second members 18e, 22e are locked or unlocked with respect to one another in response to activation of the electric motor 120e. The locking device 32e also includes a squeeze-lock 36e associated with a first shaft 34e and moved between locked and unlocked positions by the motor 120e. A switch 15e selectively activates the motor 120e.

The locking device 32e also includes an intermediary member including a second shaft 38e and linking members 44e and 42e. The shaft 38e rotates in response to rotation of the motor 120e. The linking member 44e is engaged with a second shaft 38e in a cam/cam-follower relationship. For example, the linking member 44e translates in response to rotation of the second shaft 38e. The linking member 42e rotates in response to translation of the linking member 44e. The first shaft 34e rotates in response to rotation of the linking member 42e.

Figure 11:
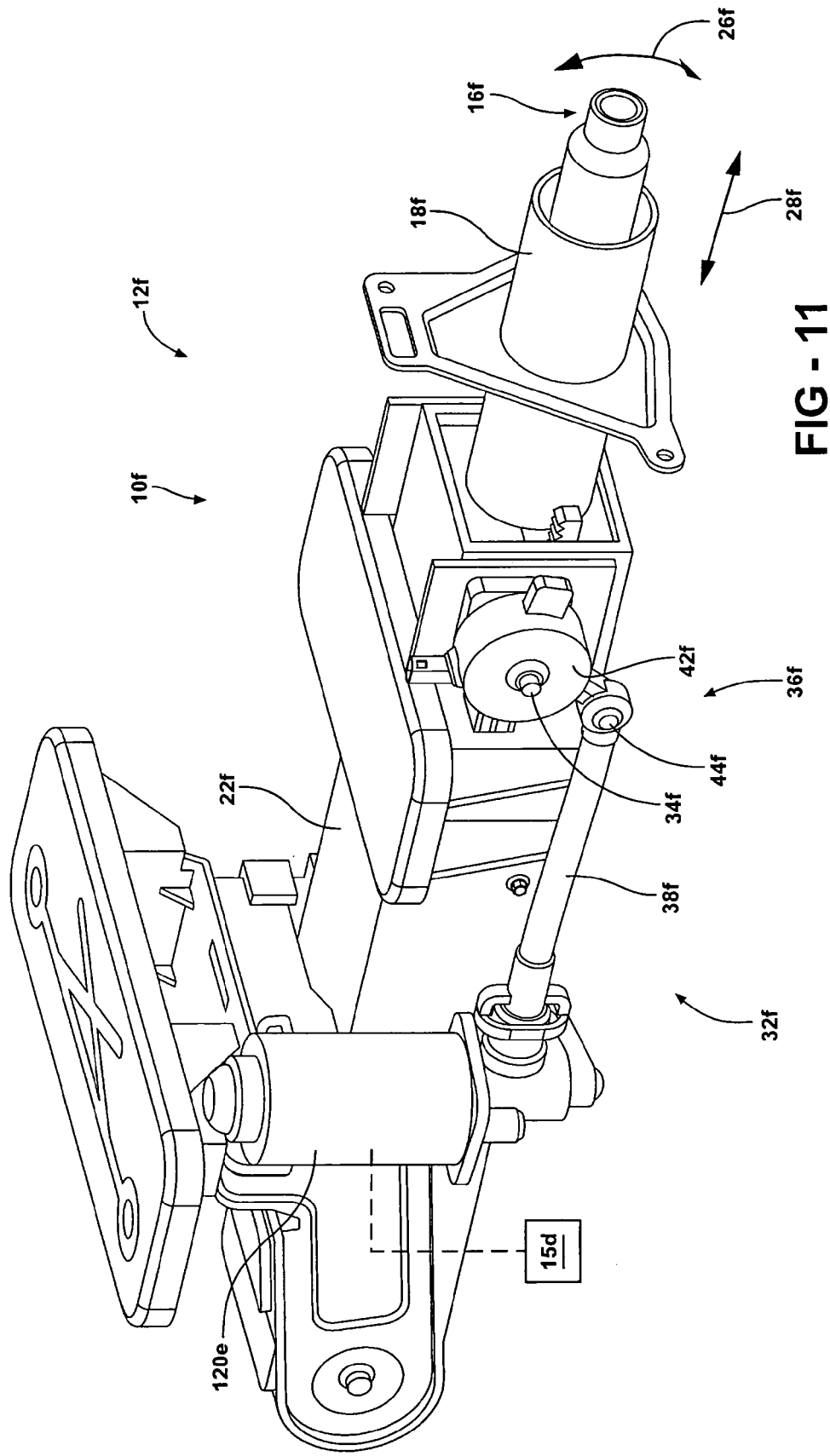
FIG. 11 is a side view of a seventh exemplary electrically actuated steering column system.

Referring now to FIG. 11, in a seventh exemplary embodiment of the electrically actuated steering column system, an apparatus 12f includes a steering column 10f and a locking device 32f. The steering column 10f includes a steering wheel supporting portion 16f for supporting a steering wheel. The steering column 10f also includes first and second members 18f, 22f that are moveable relative to one another to move the steering wheel supporting portion 16f. The first and second members 18f, 22f can support the steering wheel supporting portion 16f for movement along a tilting path 26f of movement, or a telescoping path 28f of movement, or both. The locking device 32f is selectively engageable with the first and second members 18f, 22f to lock the first and second members 18f, 22f with respect to one another and substantially prevent movement of the steering wheel supporting portion 16f. The locking device 32f includes an electric motor 120f and the first and second members 18f, 22f are locked or unlocked with respect to one another in response to activation of the electric motor 120f. The locking device 32f also includes a squeeze-lock 36f associated with a first shaft 34f and moved between locked and unlocked positions by the motor 120f. A switch 15f selectively activates the motor 120f.

The locking device 32f also includes an intermediary member including a second shaft 38f and linking members 42f, 44f. The linking member 44f is a gear and rotates in response to rotation of the second shaft 38f, the shaft 38f rotating about its longitudinal axis. The linking member 42f defines teeth engageable with teeth of the linking member 44f and rotates in response to rotation of the linking member 44f. The first shaft 34f rotates in response to rotation of the linking member 42f.

Figure 12:
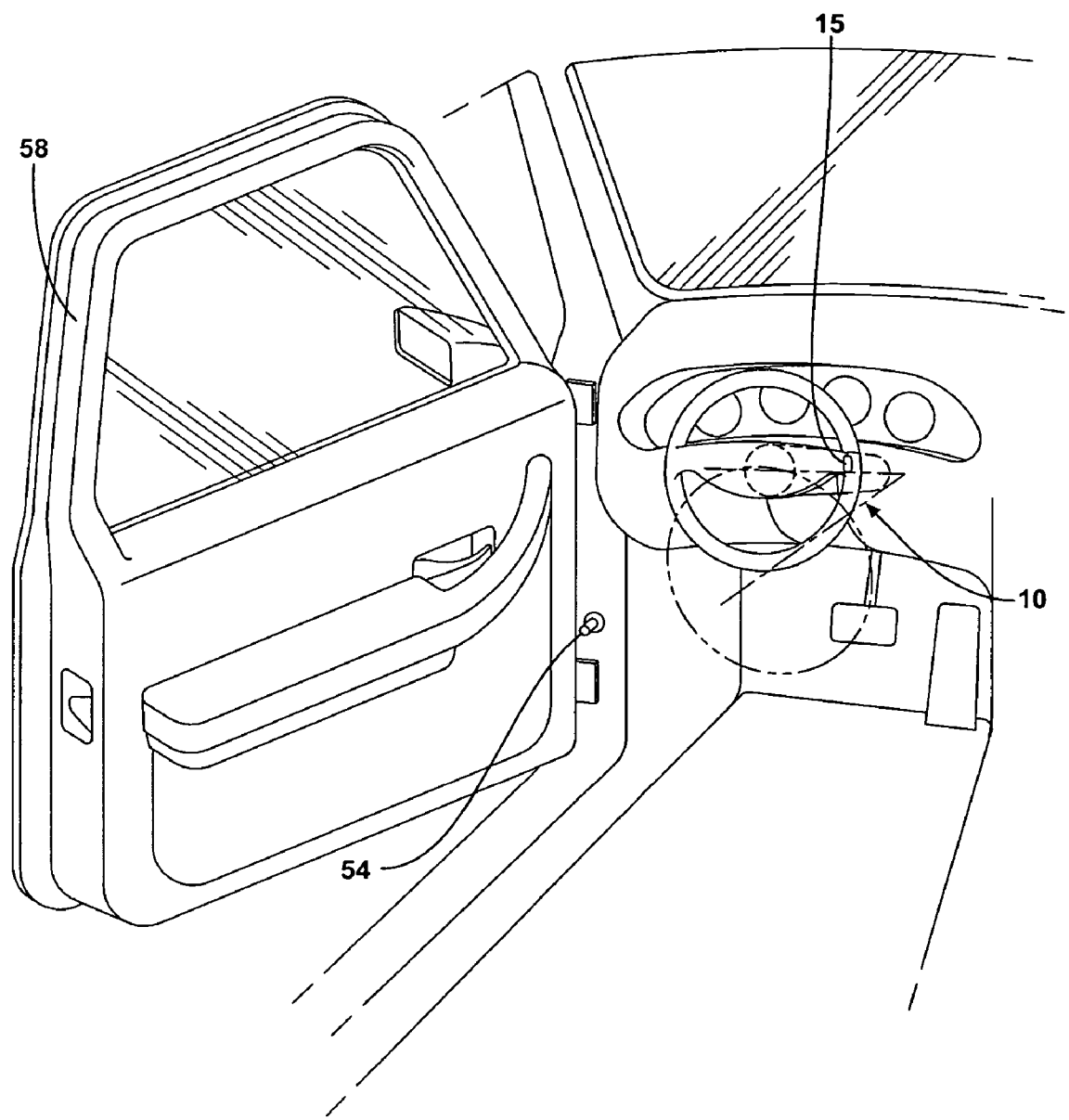
FIG. 12 is a perspective view of an eighth exemplary electrically actuated steering column system.

Referring now to FIG. 12, the electrically actuated steering column system can include a second switch 54 that is spaced from the steering column 10 and also spaced from the first switch 15. The second switch 54 communicates with the electric motor 120 to selectively activate the electric motor 120 and to move the locking device, such as any of locking devices 32–32f, between the locked and unlocked positions. In operation, when the driver of the vehicle opens the door 58, the switch 54 is engaged and the locking device is moved to the unlocked position. The steering column 10 can then be tilted upwardly and telescopically retracted to make exiting the vehicle easier. Similarly, entering the vehicle under these conditions is also easier.

Figure 15:
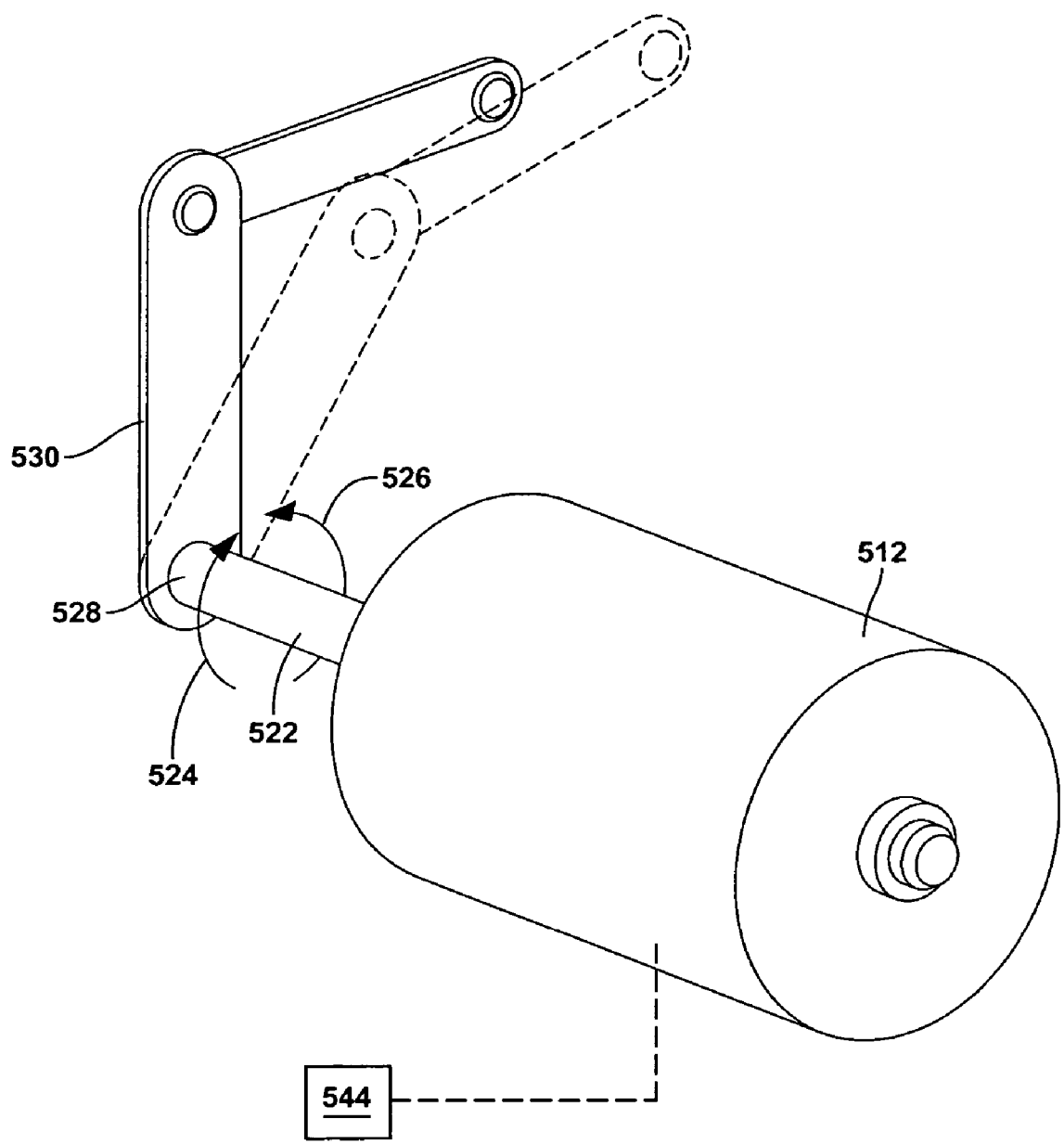
FIG. 15 is a perspective view of an electric motor and linkage associated with the first exemplary embodiment of the invention.

Referring now to FIG. 13–15, in a first exemplary embodiment of the invention, a locking device 510 includes an electric motor 512 for generating a moving force. The first locking portion 514 is associated with the electric motor 512 to move between a locked position and an unlocked position in response to the moving force. When the first locking portion 514 is in the locked position, telescoping movement between first and second members 516, 518 is prevented. The locking device 510 also includes a second locking portion 520 spaced from the first locking portion 514. The second locking portion 520 is also associated with the electric motor 512 to move between locked and unlocked positions in response to the moving force. When the second locking portion 520 is in the locked position, tilting movement associated with the first and second members 516, 518 is prevented.

The electric motor 512 includes a shaft 522 rotatable in first and second directions 524, 526. The shaft 522 includes a distal end 528. In the first exemplary embodiment of the invention, the locking portion 514 extends transverse to the shaft 522. An arm 530 extends transverse to the shaft 522 and the first locking portion 514 is pivotally connected to the arm 530. The first locking portion 514 translates in response to rotation of the shaft 522 and the arm 530. The first exemplary embodiment also includes a biasing device 542 urging the first locking portion 514 to the locked position. In operation, the motor 512 can be engaged to rotate the shaft 522 in the second direction 526 and rotate the arm 530 and move the first locking portion 514 to the unlocked position. While the first locking portion 514 is in the unlocked position, the first and second members 516, 518 can be telescopically adjusted with respect to one another and a tilting position of the first and second members 516, 518 can be adjusted. After the first and second members 516, 518 have been adjusted as desired, the motor 512 can be disengaged and the biasing device 542 can urge the first locking portion 514 to the locked position, wherein the arm 530 and shaft 522 are rotated in the first direction 524 and wherein the first locking portion 514 is wedged between the first and second members 516, 518. The first exemplary embodiment of the invention can include a controller 544 for controlling the operation of the motor 512.

The second locking portion 520 translates in response to rotation of the shaft 522. A cable 532 extends between the second locking portion 520 and the first locking portion 514. The cable 532 includes a wire movably positioned in a sheath. One end of the wire is connected to the first locking portion 514 and the other end of the wire is connected to the second locking portion 520. A first end of the sheath is connected to the first member 516 and a second end of the sheath is connected to the second member 518. Movement of the first locking portion 514 is transmitted to the second locking portion 520 through the cable 532. The second locking portion 520 and the cable 532 are arranged such that the second locking portion 520 is in the unlocked position when the first locking portion 514 is in the unlocked position. Also, when the first locking portion 514 is in the locked position, the second locking portion 520 is in the locked position.

The first and second locking portions 514, 520 are movable relative to one another while the first locking portion 514 is in the unlocked position and while the second locking portion 520 is in the unlocked position. For example, when the first and second locking portions 514, 520 are in the respective unlocked positions, the first and second members 516, 518 can telescope relative to one another or move along a tilting path of movement. The first and second members 516, 518 can tilt about a first end 534 of the first member 516. Alternatively, a third member 536 can be engaged with the second member 518 for tilting movement. In such an embodiment of the invention, the second locking portion 520 can be connected to the third member 536 or the second member 518. In addition, the second locking portion 520 can be moved while the first locking portion 514 is stationary, such as when the first and second members 516, 518 are telescopically adjusted with respect to one another.

The first and second members 516, 518 define a steering column assembly for supporting a steering wheel 540. The first member 516 defines a longitudinal axis 538. In a first exemplary embodiment of the invention, the first locking portion 514 moves between the locked and unlocked positions along a path of movement transverse to the longitudinal axis 538. The electric motor 512 is mounted to the first member 516 and the shaft 522 extends parallel to the longitudinal axis 538.

The second locking portion 520 is movably associated with the second member 518 and spaced from the first member 516. In an embodiment of the invention including a third member 536, the second locking portion 520 can be movably associated with either the second member 518 or the third member 536.

Figure 16:
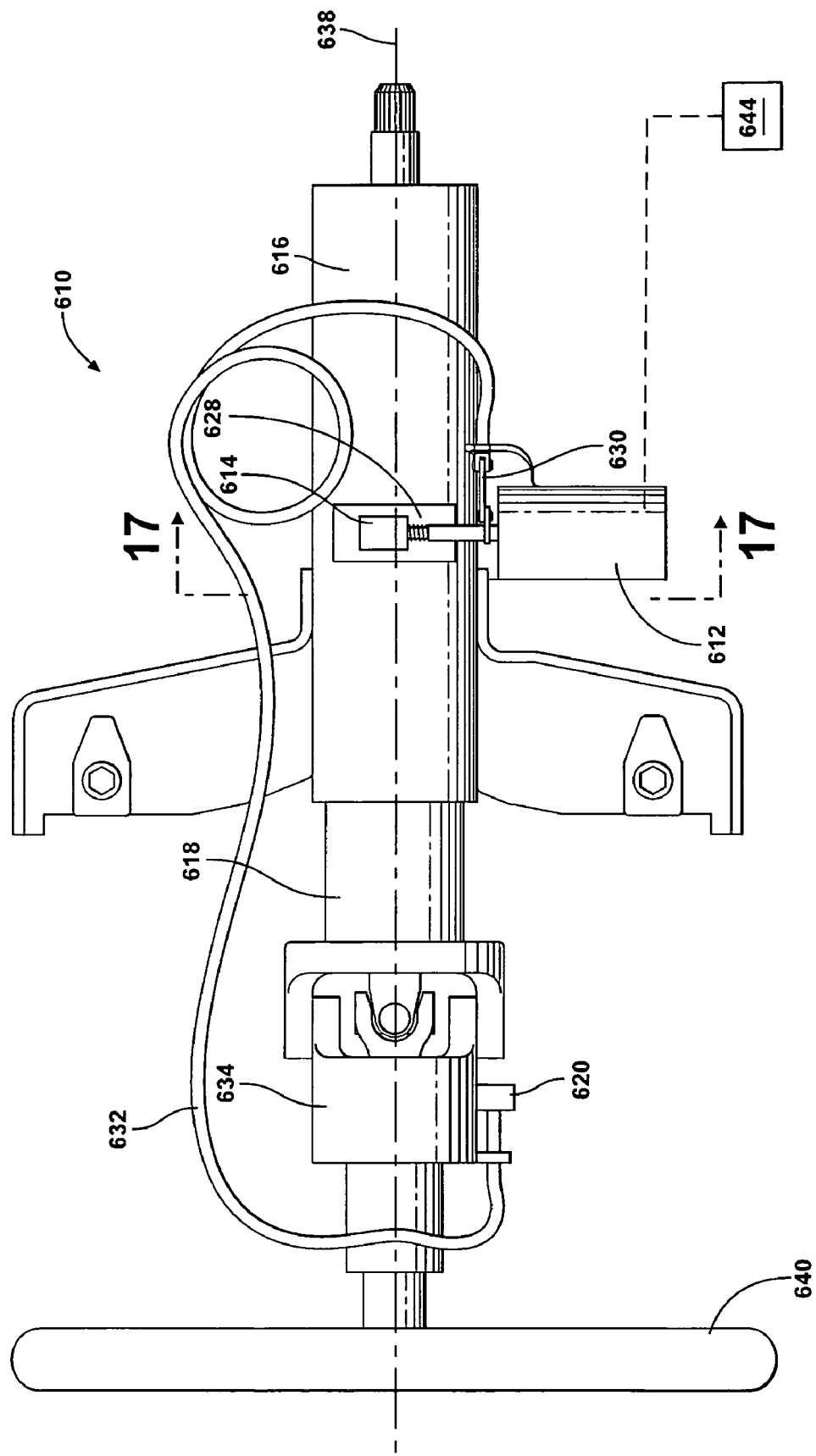
FIG. 16 is a bottom view of a second exemplary embodiment of the invention associated with the steering column.
Figure 17:
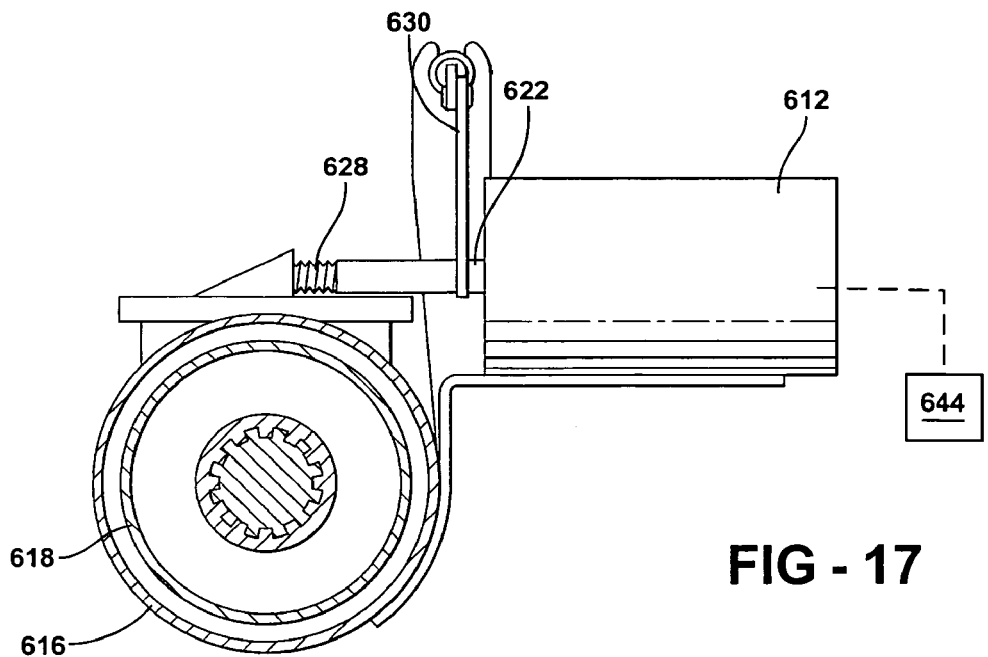
FIG. 17 is a rear view of the second exemplary embodiment shown in FIG. 16.
Figure 18:
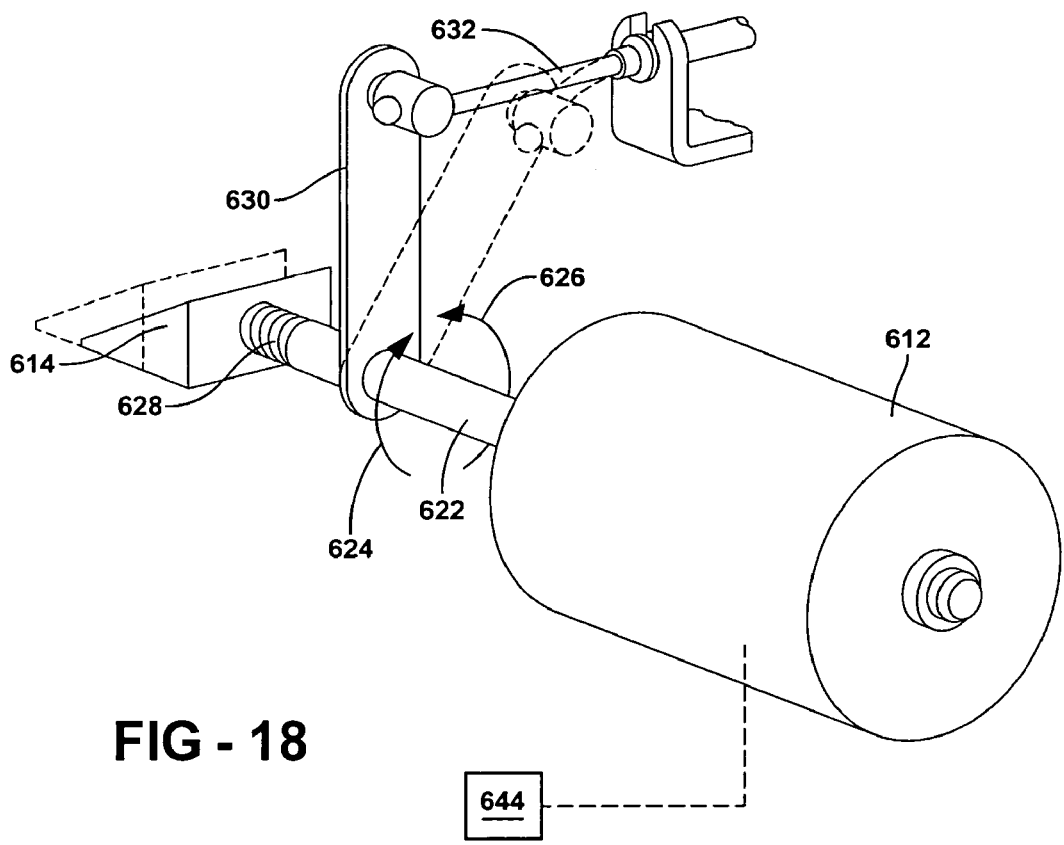
FIG. 18 is a perspective view of an electric motor, linkage and first locking portion of the second exemplary embodiment of the invention.

Referring now to FIG. 16–18, in a second exemplary embodiment of the invention, a locking device 610 includes an electric motor 612, a first locking portion 614, and a second locking portion 620. The first locking portion 614 is movable between first locked and unlocked positions in response to moving force generated by the electric motor 612 to selectively prevent telescoping movement between first and second members 616, 618. The motor 612 includes a shaft 622 rotatable in first and second directions 624, 626 and having a distal end 628. An arm 630 extends transverse to the shaft 622. The motor 612 is spaced from the first member 616. The operation of the motor can be controlled by a controller 644.

The first and second members 616, 618 define a steering column assembly substantially similar to the steering column assembly defined by the members 516, 518. For example, the first member 616 defines a longitudinal axis 638. Also, the first and second members 616, 618 can tilt about a first end 634 of the first member 616 or a third member 636 can be engaged with a second member 620 for tilting movement. Also, the first and second member 616, 618 are operable to support a steering wheel 640.

The structure and operation of the locking device 610 is substantially similar to the structure and operation of the locking device 510, with the following differences. In a second exemplary embodiment of the invention, the locking portion 614 extends parallel to the shaft 622 and is disposed at the distal end 628 of the shaft 622. The first locking portion 614 is shown in phantom in the locked position in FIG. 18, and shown in the unlocked position in solid line. The first locking portion 614 and the shaft 628 are engaged in a screw-screwdrive relation wherein rotation on the shaft 622 corresponds to translational movement of the first locking portion 614.

In addition, in the second exemplary embodiment of the invention, a cable 632 extends from the arm 630 to the second locking portion 620. Rotation of the shaft 622 in the direction 624 moves the second locking portion 620 to the locked position. Rotation of the shaft 622 in the direction 626 moves the second locking portion 620 to the unlocked position.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode comtemplated for carrying out this invention, but that the invention will include all embodiments falling within the scope of the appended claims.

What is claimed is:

1. A locking device comprising:
    an electric motor for generating a moving force;
    a first locking portion associated with said electric motor to move between first locked and unlocked positions in response to said moving force to selectively prevent telescoping movement between first and second members; and
    a second locking portion spaced from said first locking portion and associated with said electric motor to move between second locked and unlocked positions in response to said moving force to selectively prevent tilting movement associated with the first and second members, and
    a cable extending between said first locking portion and said second locking portion.

2. The locking device of claim 1 wherein said electric motor further comprises a shaft rotatable in first and second directions and having a distal end.

3. The locking device of claim 2 wherein said first locking portion extends transverse to said shaft.

4. The locking device of claim 2 wherein said first locking portion extends parallel to said shaft.

5. The locking device of claim 2 wherein said first locking portion translates in response to rotation of said shaft.

6. The locking device of claim 5 wherein said second locking portion translates in response to rotation of said shaft.

7. The locking device of claim 2 further comprising an arm extending transverse to said shaft.

8. The locking device of claim 7 wherein said first locking portion is pivotally connected to said arm.

9. The locking device of claim 7 wherein said first locking portion is disposed at said distal end of said shaft and said locking device further comprises a cable extending between said second locking portion and said arm.

10. The locking device of claim 1 wherein said first and second locking portions are moveable relative to one another while said first locking portion is in the first unlocked position and while said second locking portion is in the second unlocked position.

11. The locking device of claim 10 wherein said first and second locking portions are connected to one another with a cable.

12. The locking device of claim 11 wherein said second locking portion moves in response to movement of said first locking portion.

13. A locking device comprising:
    an electric motor for generating a moving force and having a shaft rotatable in first and second directions and a distal end;
    first and second members disposed in telescoping relationship with one another;
    a first locking portion associated with said electric motor to move between first locked and unlocked positions in response to said moving force to selectively prevent telescoping movement between first and second members; and
    a second locking portion spaced from said first locking portion and associated with said electric motor to move between second locked and unlocked positions in response to said moving force to selectively prevent tilting movement associated with the first and second members, and
    a cable extending between said first locking portion and said second locking portion.

14. The locking device of claim 13 wherein said first member includes a first end and said first and second members are disposed for said tilting movement about said first end.

15. The locking device of claim 13 further comprising a third member engaged with said second member for said tilting movement.

16. The locking device of claim 15 wherein said first member defines a longitudinal axis and said movement of said first locking portion between said first locked and unlocked positions is transverse to said longitudinal axis.

17. The locking device of claim 16 wherein said second locking portion is moveably associated with said second member and spaced from said first member.

18. The locking device of claim 17 wherein said first and second locking portions move relative to one another during telescopic movement of said first and second members relative to one another.

19. The locking device of claim 13 wherein said electric motor is mounted to said first member.

20. The locking device of claim 19 wherein said first member defines a longitudinal axis and said shaft extends parallel to said longitudinal axis.

21. The locking device of claim 13 wherein said electric motor is spaced from said first member.

22. A locking device comprising:
    an electric motor for generating a moving force and having a shaft rotatable in first and second directions and a distal end;
    a steering column having first and second members disposed in telescoping relationship with one another and supporting a steering wheel;
    a first locking portion associated with said electric motor to move between first locked and unlocked positions in response to said moving force to selectively prevent telescoping movement between first and second members, wherein said first locking portion is wedged between said first and second members of the steering column while in said first locked position;
    a second locking portion spaced from said first locking portion and associated with said electric motor to move between second locked and unlocked positions in response to said moving force to selectively prevent tilting movement associated with the first and second members; and
    a flexible cable extending from said first locking portion to transmit said moving force to said second locking portion.

23. The locking device of claim 22 wherein said first locking portion extends transverse to said shaft.

24. The locking device of claim 23 wherein said first member defines a longitudinal axis and said movement of said first locking portion between said first locked and unlocked positions is transverse to said longitudinal axis.

25. The locking device of claim 24 further comprising an arm extending transverse to said shaft, wherein said first locking portion is pivotally connected to said arm.

26. The locking device of claim 25 including a biasing device urging said first locking portion to said first locked position.

27. The locking device of claim 22 wherein said first locking portion extends from said distal end of said shaft.

28. The locking device of claim 27 further comprising an arm extending transverse to said shaft, wherein said flexible cable extends from said second locking portion to said arm.

* * * * *